United States Patent [19]
McGinnis

[11] 4,281,790
[45] Aug. 4, 1981

[54] SAFETY SHOWER HEAD

[76] Inventor: Merrill F. McGinnis, 12723 Carmen Dr., Surprise, Ariz. 85345

[21] Appl. No.: 145,781

[22] Filed: May 2, 1980

[51] Int. Cl.³ ........................................... G05D 23/12
[52] U.S. Cl. ................................ 236/93 B; 137/462; 239/75
[58] Field of Search ................. 236/93 B, 93 A, 99 J; 137/462; 251/323; 239/75, 110

[56] References Cited
U.S. PATENT DOCUMENTS

| | | | |
|---|---|---|---|
| 1,791,811 | 2/1931 | Giesler | 236/93 B |
| 2,534,378 | 12/1950 | Schlaich | 236/93 B |
| 3,368,758 | 2/1968 | Fraser | 236/93 B |
| 3,938,741 | 2/1976 | Allison | 236/93 B X |
| 4,180,208 | 12/1979 | Obermaier | 236/93 B |

Primary Examiner—William E. Topolcai, Jr.

[57] ABSTRACT

This shower head serves to replace existing shower heads, and when the water becomes too hot for safety, it is so designed, that it will stop the hot water flow from striking the bather. It consists primarily of a fixed thermostat, which, when expanded, will cause a disc attached to a piston to be, by water pressure, urged against an opening, to cut off the water flow on the bather, and the hot water is then shut off at its source by the bather. The head further includes a lower passageway leading to a depressible relief valve, for releasing the hot water from the thermostat area, so as to enable the thermostat to reset.

2 Claims, 2 Drawing Figures

SAFETY SHOWER HEAD

This invention relates to shower heads for bathing purposes, and more particularly, to a safety shower head.

It is, therefore, the principal object of this invention to provide a safety shower head, which will replace existing shower heads, and thus prevent bathers from being burned, which occurs many times each year.

Another object of this invention is to provide a safety shower head, which will employ thermostat means, not for regulating water temperature, but for ceasing water flow immediately, whenever the temperature of the water becomes too high for safety.

Another object of this invention is to provide a safety shower head, which will, when the water temperature becomes too high, close off the water flow from the shower head, when a piston in the head advances a disc over an opening in an inner wall of the head, and the piston and disc assembly will be adjustable to water pressure, by screw and spring means.

A further object of this invention is to provide a safety shower head, which will have a manually controlled relief valve, so as to enable the hot water to flow away from the thermostat area, thus enabling the thermostat to reset for normal shower use.

Other objects are to provide a safety shower head, which is simple in design, inexpensive to manufacture, rugged in construction, easy to use, and efficient in operation.

Figure 1:
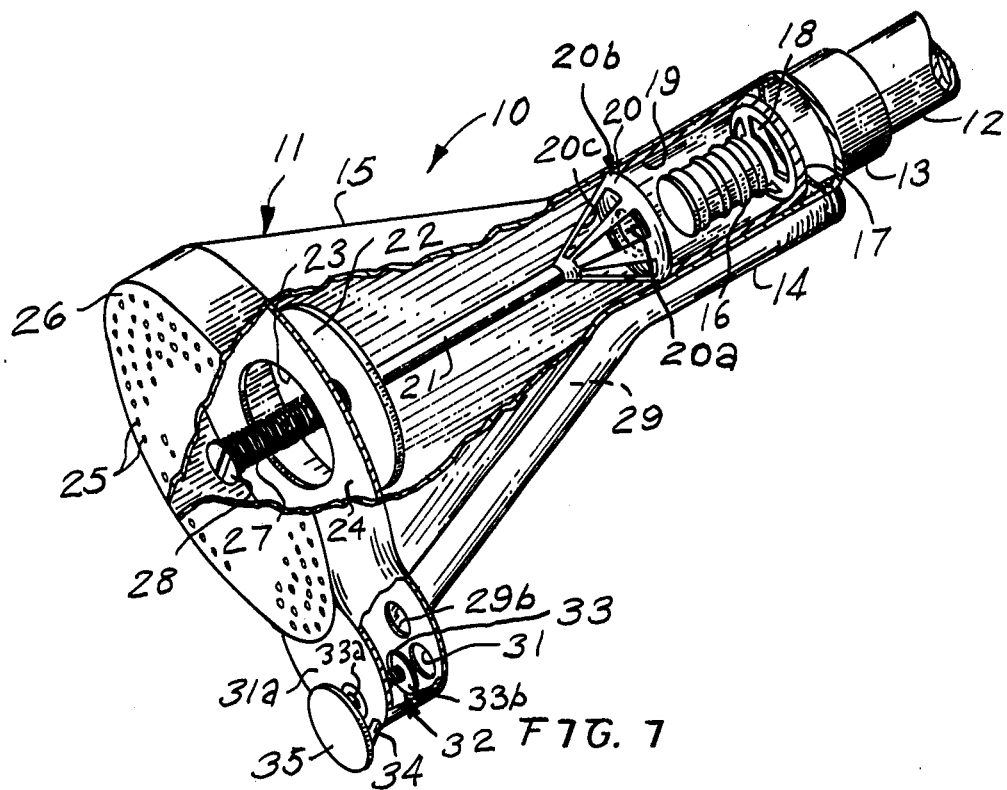
Figure 2:
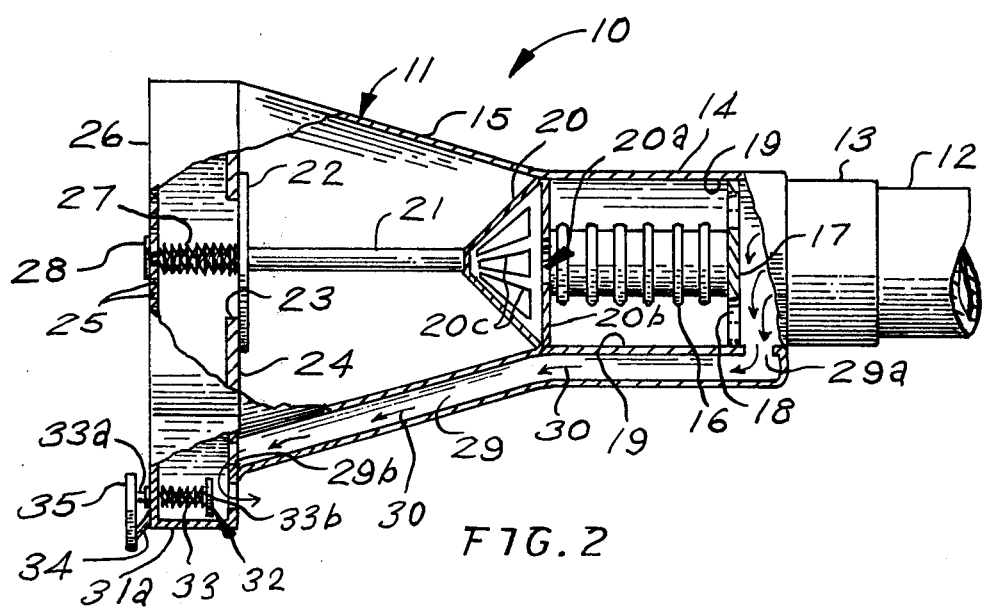

These, and other objects, will be readily evident, upon a study of the following specification, and the accompanying drawing, wherein:

FIG. 1 is a perspective view of the present invention, shown partly broken away, and illustrates the shower head in the normally open position, and FIG. 2 is a side view of FIG. 1, shown in elevation, partly broken away, and illustrates the dangerously hot water being by-passed away from the bather, for reset of the thermostat.

According to this invention, a shower head 10 is shown to include a main body 11, which is threadingly secured to water inlet pipe 12, by means of neck 13 at its rear end, in the manner well-known in the art. The cylindrical portion 14 is integrally fabricated on a conical portion 15, and a suitable thermostat 16 has its end wall 17 with openings 18, secured fixedly to the inner periphery 19 of cylindrical portion 14, for a purpose which hereinafter will be described.

A piston 20, of hollow conical configuration, includes a central opening 20a in its head 20b, for the normal passage of water, which also flows normally through the plurality of spaced-apart openings 20c, and into the conical portion 15. Piston 20 is fixedly secured to rod 21 in a suitable manner, and the opposite end of rod 21 extends through disc 22, which forms shut-off valve means, for closing off dangerously hot water from entering opening 23 of inner wall 24, that is fixedly secured in conical portion 15. Disc 22 is fixedly secured to rod 21, and when opening 23 is closed, it prevents water flow from the plurality of spray openings 25, in the face 26 of conical portion 15, so as to protect the bather from being burned.

In normal use, water enters cylindrical portion 14, by means of inlet pipe 12, and flows through openings 18, through openings 20a and 20c of piston 20, and then it flows through opening 23 of wall 24, and it exits from the spray openings 25. If the water becomes too hot, the thermostat 16 expands against opening 20a, closing it, and then water pressure in cylindrical portion 14 urges piston 20 forwards, and the disc 22 seats against wall 24, thus closing opening 23 therein, which prevents any flow of the hot water out of the openings 25 in face 26.

A coil spring 27, on adjustment screw 28 in rod 21, urges against disc 22, at one end, and urges against the opposite side of the face 26 at its opposite end, and normally urges the disc 22 and piston 20 rearwards towards thermostat 16, and screw 28 is adjustable for spring 27 tension, to obtain the desired water pressure.

A passage 29 integral of main body 11, normally fills with water, which is indicated by means of arrows 30, and water enters passage 29, by means of opening 29a in cylindrical portion 14, and it passes out of opening 29b. An opening 31, in the off-set portion 31a of the conical portion 15, enables hot water, in the thermostat 16 area, to drain off, by means of the manually operated relief valve 32, so as to enable thermostat 16 to re-set itself for further use of head 10. In normal operation of head 10, relief valve 32 seats against opening 31, thus preventing any water flow therefrom. Relief valve 32 includes a coil spring 33 on its shaft 33a, which urges, at one end, against the off-set portion 31a, and urges against disc 33b at its opposite end, which closes against opening 31, and a pivotal lever 34, secured, at one end, to off-set portion 31a, is secured to shaft 33a at its opposite end, and when pulled by the user, will uncover opening 31, and release the hot water from the thermostat 16 area, by means of passage 29, the flow of the hot water being directed rearwards of head 10, and away from the bather.

While various changes may be made in the detail construction, it is understood that such changes will be within the spirit and scope of the present invention, as is defined by the appended claims.

What I now claim is:

1. A safety shower head, comprising, in combination, a hollow main body, a thermostat secured in said hollow main body, for expanding when the water temperature is too high, to close an orifice in a piston of a shut-off valve, to prevent hot water flow on a bather immediately, and a relief valve secured in an off-set portion of said main body, for releasing the hot water away from the thermostat, after the inlet source of hot water is shut off, so as to enable normal use of said safety shower head again; the outer periphery of an end of said thermostat being fixedly secured to the inner periphery of said hollow main body, and a plurality of radially spaced-apart openings in a skirt of said piston normally receive water when said safety shower head is in use, the water normally passing through a central opening in an inner wall fixedly secured, at its outer periphery, to the inner periphery of said hollow main body, and said skirt of said piston is fixedly secured to a piston rod, and the opposite end of said piston rod threadingly receives an adjustment screw for adjusting the tension of a coil spring received on said piston rod, and one end of said coil spring urges against a disc fixedly secured to said piston rod, and the opposite end of said coil spring urges against the rear of the face of said hollow main body, and said adjustment screw is freely received in an opening in said face of said hollow main body.

2. The combination according to claim 1, wherein the water entering said hollow main body, when excessively hot, expands said thermostat, which extends at its free end against the orifice in said head of said piston, and the water pressure urges said piston and said disc forward in said hollow main body against said coil spring, and said disc seats on said inner wall, and shuts off the flow of the hot water to a plurality of spray openings in said face of said hollow main body, and said relief valve, in an off-set portion of said hollow main body, is spring-loaded, and normally closes off a passage in said hollow main body, which leads to an opening behind said end of said thermostat, that is fixedly secured in said hollow main body.

* * * * *